Figure 1:
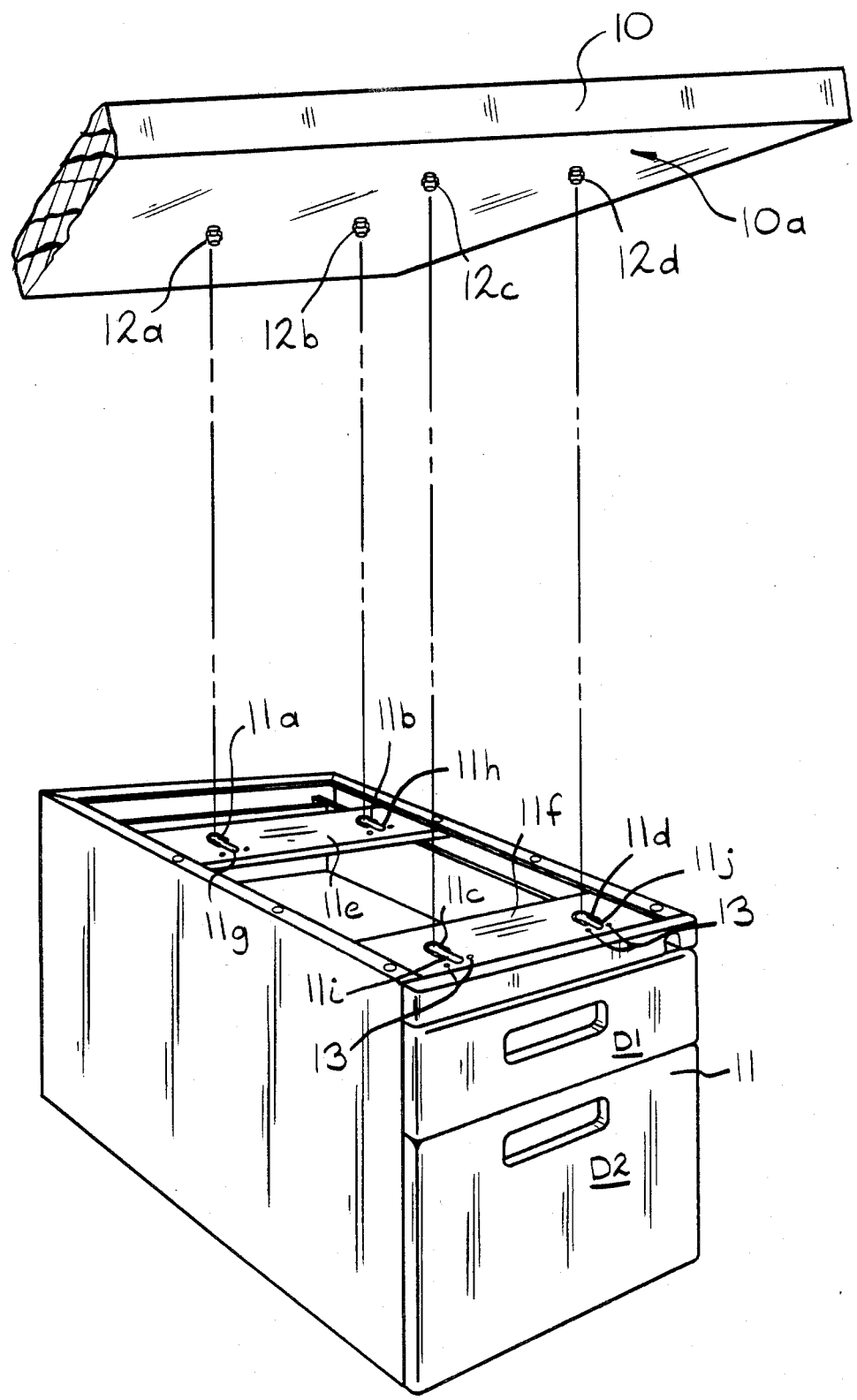

United States Patent [19]

Smuda

[11] Patent Number: 4,786,119
[45] Date of Patent: Nov. 22, 1988

[54] LOCKING CLIP FOR SECURING A BOLT HOLDING PANEL MEMBERS TOGETHER

[75] Inventor: Raymond J. Smuda, Manistee, Mich.

[73] Assignee: Metalworks, Inc., Ludington, Mich.

[21] Appl. No.: 137,157

[22] Filed: Dec. 23, 1987

[51] Int. Cl.[4] .............................................. A47B 19/00
[52] U.S. Cl. .................................. 312/195; 248/223.1;
 108/157; 403/329; 403/406.1
[58] Field of Search ........................... 312/195, 257 R;
 108/157; 24/457, 458; 292/303; 248/223.1;
 403/329, 326, 406.1, 380, 353

[56] References Cited

U.S. PATENT DOCUMENTS

| 795,957 | 8/1905 | Cartland | 108/157 X |
| 2,621,357 | 12/1952 | Stuman | 248/223.1 X |
| 4,601,247 | 7/1986 | Welch et al. | 24/458 X |
| 4,633,789 | 1/1987 | Kortering et al. | 248/223.1 |

*Primary Examiner*—Joseph Falk
*Attorney, Agent, or Firm*—Ian C. McLeod

[57] ABSTRACT

A locking clip (20) for a bolt (12a to 12d) securing a desk top (10) and a pedestal (11) as panel members together is described. The clip engages the head (12i) of the bolt which is slid in a slot (11g to 11j) in a cross-member (11f) of the pedestal. The clip provides positive locking to prevent inadvertent separation of the panel members and allows the panel members to be separated by lifting a tab (20g).

14 Claims, 2 Drawing Sheets

LOCKING CLIP FOR SECURING A BOLT HOLDING PANEL MEMBERS TOGETHER

BACKGROUND OF THE INVENTION (1) Summary of the Invention

The present invention relates to a locking clip for securing a bolt in position in a slot in one of two panel members to be separably joined together, particularly a desk top and pedestal supporting the top. In particular, the present invention relates to a locking clip which is secured to one of the panel members over the slot in this member to hold the head of a bolt depending from the adjacent panel member in position in the slot.

(2) Prior Art

The prior art is particularly set forth in U.S. Pat. Nos. 2,383,068 to MacLean; 2,709,390 to Smith; 2,999,125 to Young; 3,178,987 to Reese et al; 3,888,064 to Basile; 3,491,820 to Ostling; 3,634,983 to Welch; 3,996,718 to Welch; and 4,470,716 to Welch.

In the Ostling and Welch patents, the locking tab is integral with the fastening clip defining the slot for engaging the head of the bolt which holds the panel members together. The clip has an intricate construction since it performs a dual function, i.e. holding and locking. Also the whole clip must be made of the same type of steel. Such a clip is relatively expensive. The clip can be dislodged in use because of the small size of the clip.

Reese describes a retainer clip; however the clip is freely moveable with the pin around the axis of the pin and would not be suitable for joining panel members together since the retainer clip can slide from the locked position. In Young the clip is not secured to the insulator which can slide apart. Smith shows a clip which is not secured to the panel and thus would not provide positive locking. MacLean and Basile show the use of locking rings which can easily be displaced along the surfaces of the members being joined together.

The problem faced by the prior art is to provide positive locking of a bolt in a slot in one of the panel members so that the panel members can not be displaced in a direction parallel to the surfaces of the panel members causing them to come apart. There is a significant risk of injury and liability should this happen with a desk top and pedestal supporting the top.

OBJECTS

It is therefore an object to provide a separate locking clip which provides positive locking of the bolt in the slot in one of the panel members. Further it is an object to provide a locking clip which is inexpensive to manufacture and mount on the member. These and other objects will become increasingly apparent by reference to the following description and the drawings.

IN THE DRAWINGS

FIG. 1 is a separated perspective view of a desk top 10 and pedestal 11 supporting the top 10 with drawers D1 and D2 particularly illustrating the bolts 12a to 12d and slots 11g to 11j for securing the top 10 and pedestal 11 together.

Figure 2:
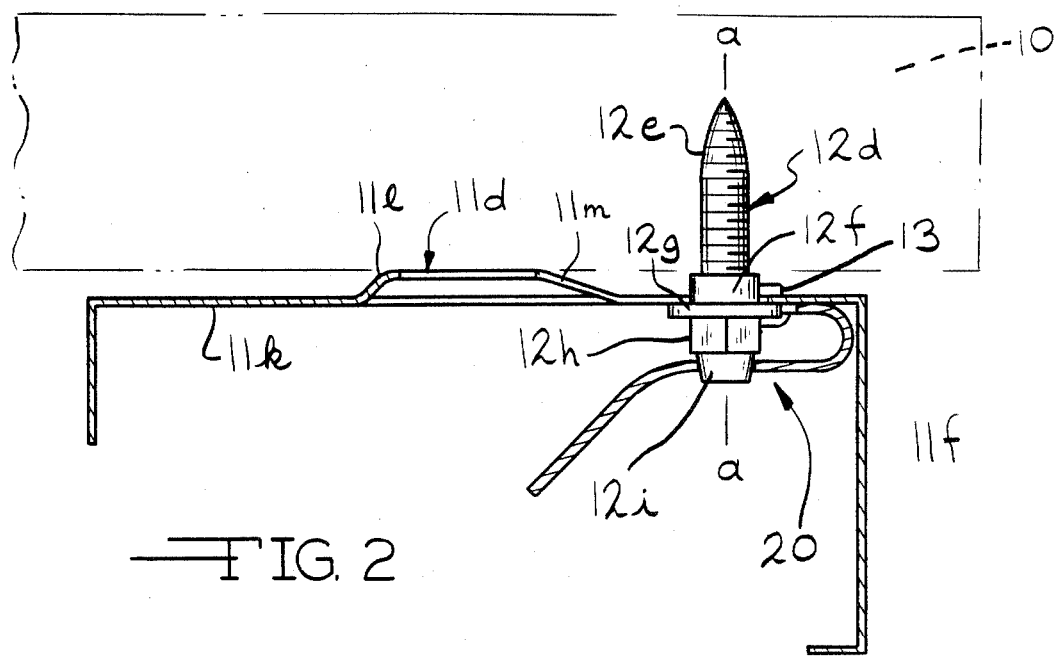

FIG. 2 is a front cross-sectional view illustrating a mounted locking clip 20 on a panel or cross member 11f which holds the desk top 10 and the panel or cross-member 11f of 11 in position by engaging the head 12i of the bolt 12d.

Figure 3:
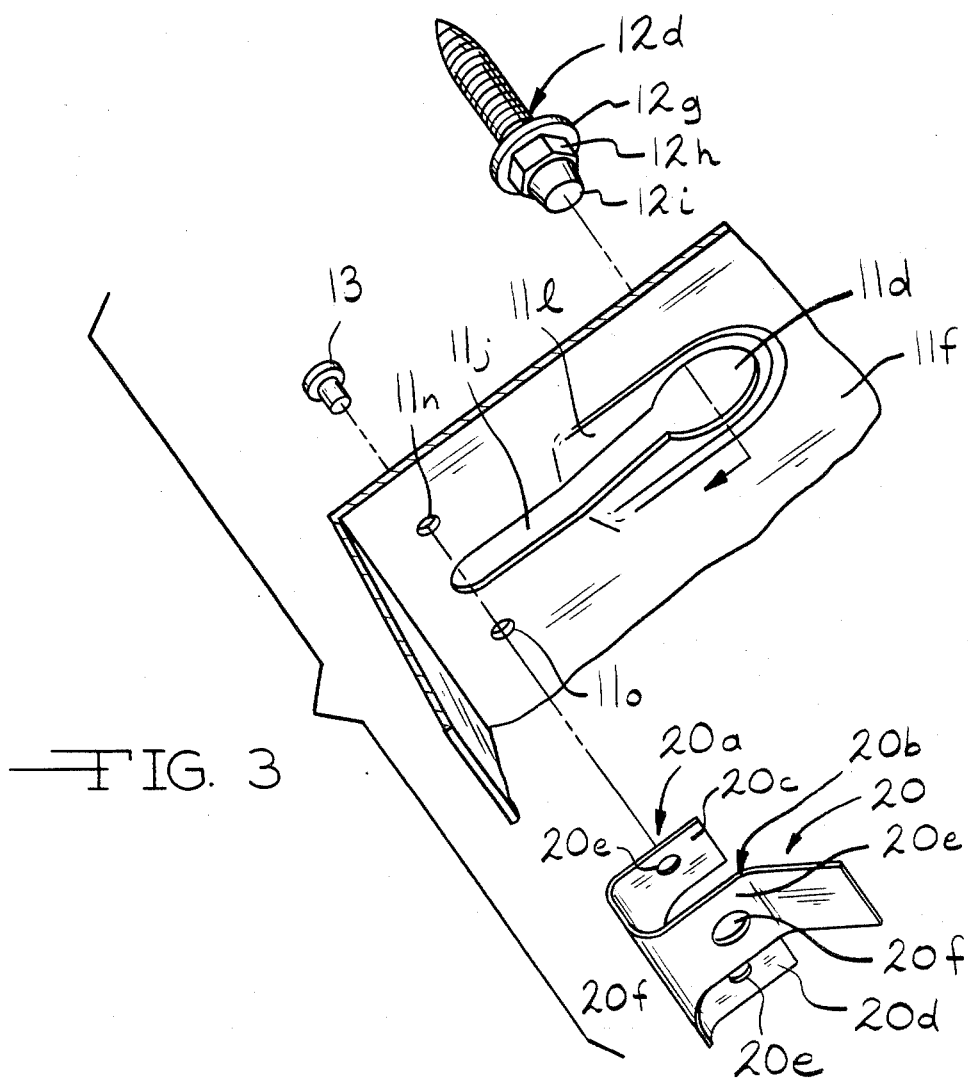

FIG. 3 is a separated perspective view of the clip 20, panel or cross-member 11f and bolt 12d illustrating the assembly in dotted lines and arrows.

GENERAL DESCRIPTION

The present invention relates to a device for use in locking two panel members having spaced apart surfaces together by means of a bolt with a shaft defining a longitudinal axis of the bolt mounted on one member with the axis perpendicular to the surface and with a head projecting from the shaft along the axis of the bolt which inserts into a opening so that a portion of the shaft slides into a slot connected to the opening in the other panel member which engages the head of the bolt to hold the panel members together which comprises:

an integral clip for locking the bolt in the slot, wherein in a locked position the clip has a U-shape so that there are two spaced apart sides perpendicular to the axis of the bolt, wherein the clip is mounted on the surface of the other panel member over the slot adjacent the head of the bolt with spaced apart first and second legs on one of the sides of the U to be secured to the other panel member on either side of the slot and with a third leg on the other side of the U which extends over the head of the bolt between and spaced from the first and second legs and with a hole in the third leg which engages the head of the bolt when the panel members are in the locked position, wherein the third leg moves up and over the head of the bolt and snaps into the locked position with the head in the hole when the shaft of the bolt is moved in the slot into the locked position, wherein the third leg has a tab extending away from the other member and wherein the tab can be lifted to disengage the hole in the third leg of the clip from the head of the bolt so that the shaft of the bolt can be slid in the slot towards the opening in the other member to disengage the panel members.

Further the present invention relates to a joint structure for joining and locking two panel members together which comprises: a bolt with a shaft defining a longitudinal axis mounted on one panel member with the shaft perpendicular to the surface of the one member and with a head projecting from the shaft along the axis of the bolt which inserts into an opening so that a portion of the shaft slides into a slot connected to the opening in the other panel member which engages the head of the bolt to hold the panel members together; and an integral clip for locking the bolt in the slot, wherein in a locked position the clip has a U-shape so that there are two spaced apart sides perpendicular to the axis of the bolt, wherein the clip is mounted on the surface of the other panel member over the slot and adjacent the head of the bolt with spaced apart first and second legs on one of the sides of the U to be secured to the other panel member on either side of the slot and with a third leg on the other side of the U which extends over the head of the bolt between and spaced from the first and second legs and with a hole in the third leg which engages the head of the bolt when the panel members are in the locked position, wherein the third leg moves up and over the head of the bolt and snaps into the locked position with the head in the hole when the shaft of the bolt is moved in the slot into the locked position, wherein the third leg has a tab extending away from the other member and wherein the tab can be lifted to disengage the hole in the third leg of the clip from the head of the bolt so that the shaft of the bolt can be slid in the slot towards the opening in the other member to disengage the panel members.

Thus the locking clip provides a positive means of securing the bolt in the slot in the panel member opposite the panel member supporting the bolt. The slots are built into the panel member.

SPECIFIC DESCRIPTION

A desk top 10 is to be joined to a pedestal 11, as shown in FIG. 1, supporting drawers $D_1$ and $D_2$. The top 10 includes four bolts 12a, 12b, 12c and 12d which depend from the underside or surface 10a of the top 10. The bolts 12a to 12d fit into openings 11a and 11b, on rearward cross member 11e and openings 11c and 11d in forward cross member 11f. Slots 11g, 11h, 11i and 11j are connected to the openings 11a to 11d. The bolts 12a to 12d move in slots 11g to 11j to a locked position towards the front of the drawers D1 and D2. A clip 20 (FIG. 2 and 3) holds the top 10 and pedestal 11 in the locked position. The slots 11g to 11j in the cross-members 11e and 11f securely hold the bolts 12a to 12d in position. The pedestal 11 would have to tear apart before the top 10 and pedestal 11 would separate.

The clip 20 is secured to the underside 11k of the forward or rearward cross member 11e or 11f adjacent the slots 11g or 11h or slots 11i and 11j. It is necessary to only have two of the clips 20 to insure locking of the top 10 and pedestal 11. The clips 20 are secured to the member 11e or 11f by means of rivets 13.

FIGS. 2 and 3 show one bolt 12d in slot 11j. The bolt 12d has axis a-a and includes a shaft 12e which is threaded and a smooth portion 12f which engages the sides of the slot 11j. A flange 12g engages the member 11f around the slot 11j. The bolt 12d has a wrench engaging portion 12h and a conically shaped head 12i. The head 12i could be slotted to accept a screw driver (not shown). The member 11f has a raised portion 11 1 which engages the top 10 around the opening 11d which allows the smooth portion 12f to move into slot 11j. A ramp 11m inclines away from the top 10 so that the top 10 and member 11f are held tightly together. Openings 11n and 11o are provided for rivets 13.

As shown in FIG. 3, the clip 20 has a U shape with opposed sides 20a and 20b. Side 20a includes two spaced apart first and second legs 20c and 20d with openings 20e for the rivets 13. The other side 20b includes a third leg 20e which is spaced from and between the first and second legs 20c and 20d. The third leg 20e has a hole 20f which snaps into position over the head 12i of the bolt 12. A tab 20g is provided so that the third leg 20e can be lifted to disengage the hole 20f from the head of the bolt 12d. so that the pedestal 11 can be removed from the top 10.

For installation of the pedestal 11 on top 10, the top 10 is positioned with the bolts 12a to 12d in holes 11a to 11d and then the bolts 11a to 11d are slid in slots 11g to 11i to the locked position where the hole 20f of clip 20 snaps into position on the head 12i of bolt 12d. There is a corresponding clip (not shown) adjacent to slot 11i. The clips could also be mounted on panel or cross-member 11e.

It is intended that the foregoing description be only illustrative of the present invention and that the present invention be limited only by the hereinafter appended claims.

I claim:

1. A device for use in locking two panel members having spaced apart surfaces together by means of a bolt having opposed ends with threads adjacent one of the ends of the bolt along a shaft defining a longitudinal axis of the bolt mounted by the threads on one member with the axis perpendicular to the surface and with a head projecting from the shaft along the axis of and at the other of the ends of the bolt which inserts into an opening so that a portion of the shaft slides into a slot connected to the opening in the other panel member which engages the head of the bolt to hold the panel members together which comprises:

(a) an integral clip for locking the bolt in the slot, wherein in a locked position the clip has a U-shaped so that there are two spaced apart sides perpendicular to the axis of the bolt, wherein the clip is mounted on the surface of the other panel member over the slot adjacent the head of the bolt with spaced apart first and second legs on one of the sides of the U to be secured to the other panel member on either side of the slot and with a third leg on the other side of the U which extends over the head of the bolt between and spaced from the first and second legs and with a hole in the third leg which engages the head of the bolt when the panel members are in the locked position, wherein the third leg moves up and over the head of the bolt and shape into the locked position with the head in the hole when the shaft of the bolt is moved in the slot into the locked position, wherein the third leg has a tab extending away from the other member and wherein the tab can be lifted to disengage the hole in the third leg of the clip from the head of the bolt so that the shaft of the bolt can be slid in the slot towards the opening in the other member to disengage the panel members; and (b) the head of the bolt having a truncated shape with a smaller cross-section at the other of the ends of the bolt so that the head can engage the hole at a larger cross-section of the truncated shape spaced from the other end in the locked position, with a flange adjacent to the head which can engage the surface of the other panel member around the slot and with a portion of the shaft engaging the slot.

2. The device of claim 1 wherein a wrench engaging portion is provided between the head and the flange.

3. The device of claim 2 with the panel members wherein the other panel member around the opening and a part of the slot has a raised portion towards the one panel member with a ramp leading away from the one panel member to a remaining part of the slot adjacent the locked position and wherein the flange on the bolt pulls the members together when the flange on the bolt is moved in the slot and up the ramp to the locked position and wherein the ramp engages the surface of the one panel member to hold the panel members in a predetermined position.

4. The device of claim 1 wherein the hole in the third leg is circular and wherein the head of the bolt has a truncated conical shape which fits into the hole.

5. The device of claim 1 wherein the first and second legs of the clip have holes for riveting the clip to the other panel member.

6. The device of claim 1 with the panel members wherein the other panel member is a part of a desk pedestal and wherein the one panel member is a desk top with the surface of the underside.

7. The device of claim 6 with the panel members wherein there are two forward and two rearward bolts in the desk top which mount in slots in two forward and two rearward portions of the pedestal, wherein there are two spaced apart clips mounted adjacent the slots in the forward or rearward portions of the pedestal for securing the desk top in the locked position with the shafts of the bolts in the slots on the two forward and two of the rearward portions of the pedestal.

8. A joint structure joining and locking two panel members together which comprises:
  (a) a bolt having opposed ends with threads adjacent one of the ends of the bolt along a shaft defining a longitudinal axis mounted by the threads on one panel member with the shaft perpendicular to the surface of the one member and with a head projecting from the shaft along the axis of and at the other of the ends of the bolt which inserts into an opening so that a portion of the shaft slides into a slot connected to the opening in the other panel member which engages the head of the bolt to hold the panel members together; and
  (b) an integral clip for locking the bolt in the slot, wherein in a locked position the clip has a U-shape so that there are two spaced apart sides perpendicular to the axis of the bolt, wherein the clip is mounted on the surface of the other panel member over the slot and adjacent the head of the bolt with spaced apart first and second legs on one of the sides of the U to be secured to the other panel member on either side of the slot and with a third leg on the other side of the U which extends over the head of the bolt between and spaced from the first and second legs and with a hole in the third leg which engages the head of the bolt when the panel members are in the locked position, wherein the third leg moves up and over the head of the bolt and snaps into the locked position with the head in the hole when the shaft of the bolt is moved in the slot into the locked position, wherein the third leg has a tab extending away from the other member and wherein the tab can be lifted to disengage the hole in the third leg of the clip from the head of the bolt so that the shaft of the bolt can be slid in the slot towards the opening in the other member to disengage the panel members wherein the head of the bolt has a truncated shape with a smaller cross-section at the other of the ends of the bolt so that the head engages the hole at a larger cross-section of the truncated shape spaced from the other end in the locked position, wherein a flange is provided adjacent to the head of the bolt which engaged the surface of the other panel member around the slot and wherein a portion of the shaft engages the slot.

9. The joint structure of claim 8 wherein a wrench engaging portion is provided between the head and the flange.

10. The joint structure of claim 9 wherein the other member around the opening and part of the slot has a raised portion towards the one panel member around the opening a ramp away from the one panel member leading to a remaining part of the slot adjacent the locked position and wherein the flange on the bolt pulls the members together when the flange on the bolt is moved in the slot and up the ramp to the locked position and wherein the ramp engages the one panel member to hold the panel members in a predetermined position.

11. The joint structure of claim 9 wherein the hole in the third leg is circular and wherein the head of the bolt has a truncated conical shape which fits into the hole.

12. The joint structure of claim 9 wherein the first and second legs of the clip have holes for riveting the clip to the other panel member.

13. The joint structure of claim 9 wherein the other panel member is part of desk pedestal wherein the other member is a desk top with the surface on an underside.

14. The joint structure of claim 13 wherein there are two forward and two rearward bolts in the desk top which mount in slots in two forward and two rearward portions of the pedestal, wherein there are two spaced apart clips mounted on a forward or rearward portion of the pedestal for securing the desk top in the locked position with the shaft of the bolts in the slots on two of the two forward and two of the rearward portions of the pedestal.

* * * * *

UNITED STATES PATENT AND TRADEMARK OFFICE
CERTIFICATE OF CORRECTION

PATENT NO. : 4,786,119

DATED : November 22, 1988

INVENTOR(S) : Raymond J. Smuda

It is certified that error appears in the above—identified patent and that said Letters Patent is hereby corrected as shown below:

References from Applicant's PTO-1449 should be listed under References Cited, as follows:

| | | |
|---|---|---|
| 2,383,068 | 8/1945 | MacLean |
| 2,709,390 | 5/1955 | Smith |
| 2,999,125 | 9/1961 | Young |
| 3,178,987 | 4/1965 | Reese et al |
| 3,888,064 | 6/1975 | Basile |
| 3,491,820 | 1/1970 | Ostling |
| 3,996,718 | 12/1976 | Welch |
| 4,470,716 | 9/1984 | Welch |
| 3,634,983 | 1/1972 | Welch |

Column 1, line 67, before "11", --pedestal-- should be inserted.

Column 2, line 12 "a" (first occurrence) should be --an--.

Column 4, line 13 "shaped" should be --shape--.

Column 4, line 26 "shape" should be --snaps--.

UNITED STATES PATENT AND TRADEMARK OFFICE
CERTIFICATE OF CORRECTION

PATENT NO. : 4,786,119

DATED : November 22, 1988

INVENTOR(S) : Raymond J. Smuda

It is certified that error appears in the above-identified patent and that said Letters Patent is hereby corrected as shown below:

Column 6, line 31 "a" should be inserted before "desk" and "and" should be inserted before "wherein".

Signed and Sealed this

Thirtieth Day of May, 1989

Attest:

DONALD J. QUIGG

Attesting Officer

Commissioner of Patents and Trademarks